(12) United States Patent
Dietrich

(10) Patent No.: US 6,846,047 B2
(45) Date of Patent: Jan. 25, 2005

(54) TENSIONED SPOKED WHEEL ASSEMBLY AND SPOKE RIM AND NIPPLE THEREFOR

(76) Inventor: Rolf Dietrich, 4631 Shadowood La., Toledo, OH (US) 43614

( * ) Notice: Subject to any disclaimer, the term of this patent is extended or adjusted under 35 U.S.C. 154(b) by 0 days.

(21) Appl. No.: 10/262,312

(22) Filed: Sep. 30, 2002

(65) Prior Publication Data

US 2003/0062762 A1 Apr. 3, 2003

Related U.S. Application Data

(60) Provisional application No. 60/325,826, filed on Sep. 28, 2001.

(51) Int. Cl.[7] ............................................. B60B 1/04
(52) U.S. Cl. ................................. 301/58; 301/95.104
(58) Field of Search ........................... 301/55, 58, 61, 301/95.104, 95.106, 104; 29/894.33

(56) References Cited

U.S. PATENT DOCUMENTS

| 502,500 | A | * | 8/1893 | Perkins | |
|---|---|---|---|---|---|
| 518,627 | A | * | 4/1894 | Rastetter | |
| 546,320 | A | * | 9/1895 | Goodrich | 301/58 |
| 1,223,140 | A | * | 4/1917 | Boudreaux | |
| 1,734,184 | A | * | 11/1929 | Stoler | |
| 2,037,981 | A | * | 4/1936 | Horn | |
| 2,937,905 | A | | 5/1960 | Altenburger | |
| 4,226,478 | A | * | 10/1980 | Brown | |
| 4,286,824 | A | * | 9/1981 | Brown | |
| 4,583,787 | A | | 4/1986 | Michelotti | |
| 4,585,277 | A | | 4/1986 | Watanabe | |
| 4,824,177 | A | | 4/1989 | Aloy | |
| 5,542,777 | A | | 8/1996 | Johnson | |
| 5,673,976 | A | | 10/1997 | Hillis et al. | |
| 5,769,584 | A | * | 6/1998 | Claes | 411/427 |
| 6,036,279 | A | | 3/2000 | Campagnolo | |
| 6,036,281 | A | | 3/2000 | Campbell | |
| 6,155,651 | A | | 12/2000 | Mizata et al. | |
| 6,205,664 | B1 | | 3/2001 | Cappellotto | |
| 6,409,278 | B1 | | 6/2002 | Nakajima | |
| 6,497,042 | B1 | * | 12/2002 | Dietrich | 29/894.333 |

FOREIGN PATENT DOCUMENTS

| CH | 355041 | | 6/1961 | |
|---|---|---|---|---|
| EP | 0295194 | * | 12/1988 | 301/58 |
| EP | 0714791 | | 6/1996 | |
| EP | 0860301 | | 8/1998 | |
| FR | 1498599 | | 1/1968 | |
| FR | 1516857 | | 6/1968 | |
| FR | 2378642 | * | 9/1978 | 301/58 |
| JP | 60-38201 | * | 2/1985 | |
| JP | 61-81801 | * | 4/1986 | 301/58 |
| WO | WO 0061387 | | 10/2000 | |
| WO | WO 0220338 | | 3/2002 | |

* cited by examiner

*Primary Examiner*—Russell D. Stormer
(74) *Attorney, Agent, or Firm*—John C. Purdue; David C. Purdue

(57) ABSTRACT

An improved wheel rim, an improved spoke nipple and an improved wheel are disclosed. The rim has spoke openings and a threaded end of each spoke extends therethrough. An internal nipple with a threaded bore is connected to the threaded spoke end so that a first, ball-shaped, rounded end of the nipple is seated on the rim. A portion of the rim around each spoke opening is deformed or removed so as to define a portion of a socket with the same curvature as the first end of the nipple. This minimizes the required diameter of the spoke opening in the rim and maximizes the area of the rim socket surface. The invention also extends to an external nipple with a rounded collar in combination with a rim including a concave rounded rim surface formed in the rim itself.

12 Claims, 4 Drawing Sheets

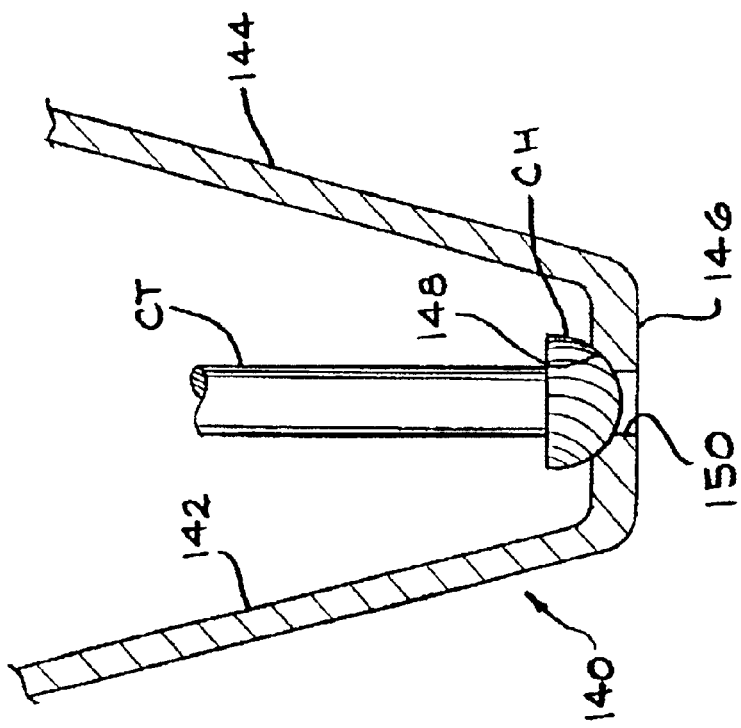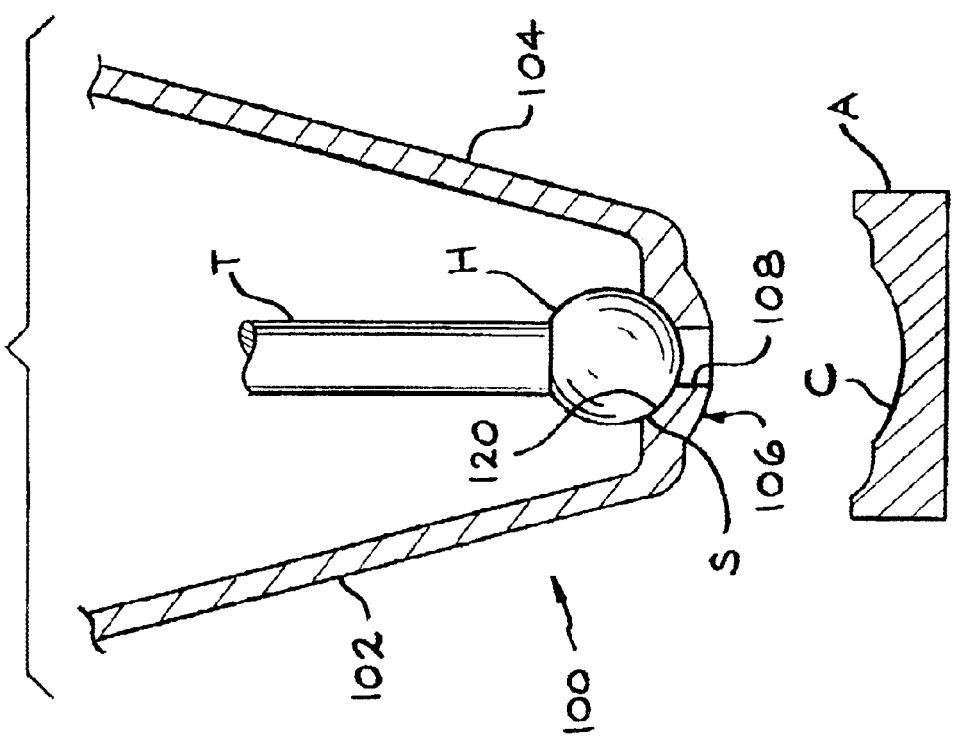

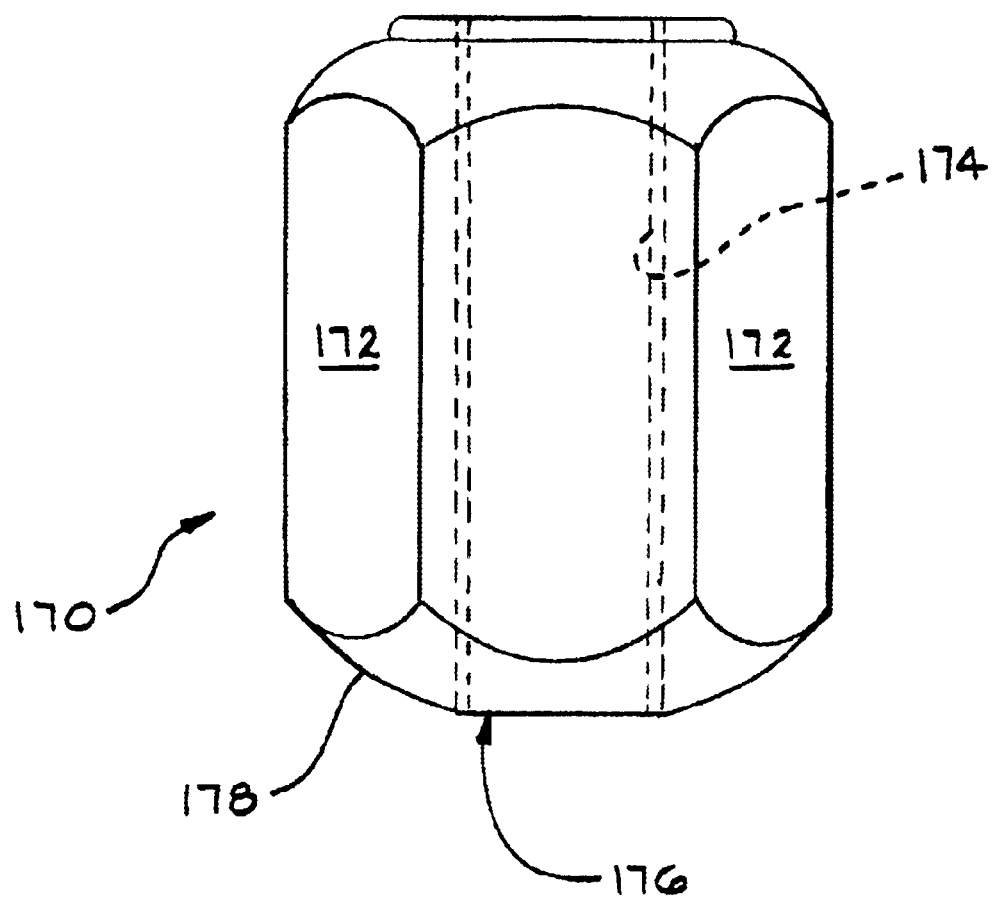

TENSIONED SPOKED WHEEL ASSEMBLY AND SPOKE RIM AND NIPPLE THEREFOR

BACKGROUND OF THE INVENTION

1. Field of the Invention

The present invention relates generally to wheels for human powered vehicles such as bicycles, wheel chairs and the like, and especially to a novel wheel with a unique rim and unique spoke nipples.

2. Description of the Prior Art

Spokes and rims for wheels for human powered vehicles have been the subject of numerous innovations over the years.

U.S. Pat. No. 2,937,905 (Altenburger) discloses a tubeless tire rim and a way to connect spokes to it.

U.S. Pat. No. 5,769,584 (Claes), the disclosure of which is incorporated herein by reference, discloses a nut for a spoke in a bicycle wheel. The nut has an enlarged head with a rounded collar, which permits the nut to align itself in a spoke hole of the rim when a spoke connected in the nut is put into tension by the nut. The nut or nipple is what is commonly referred to as an external nipple, which means that a portion of the nipple extends through the spoke hole in the rim and is accessible outside of the rim cavity. That external portion of the nipple has four flats that cooperate, in a known manner, with a nut spanner for rotating the nut externally, i.e., outside, of the rim.

The structure disclosed in Claes includes a lining or eyelet 13, which is seated in each spoke bore in the rim of the wheel. Each lining or eyelet has an upper flange that rests on an upper surface of the rim bottom, a cylindrical side wall, which extends downwardly from the upper flange and through the spoke opening in the rim and a lower flange which rests on a lower surface of the rim. The patent appears to be silent about how such an insert or eyelet is secured to the rim, but clearly it involves an upset operation to seat the eyelet in the rim within the spoke opening. The insert defines a ring on which the rounded collar is supported. Due to the external portion of the spoke nut extending through the spoke hole or opening in the rim, and through the spoke hole or opening in the eyelet or insert, and the clearance required for the spoke and the external portion of the nut to pivot to the degree required to accommodate what is defined hereinafter as the centering angle and the torsional angle, the spoke hole or opening is, necessarily, many times larger than the diameter of the spoke itself. As a consequence, the surface on which the rounded collar rests is relatively small because of the large opening required to accommodate the spoke and the external portion of the nipple.

European Published patent application no. EP 0 714 791 discloses an external nipple with a rounded collar which rests on an insert called a guide. Swiss Patent No. 355041 discloses an external nipple with a rounded collar that rests on an insert in the rim. French Patent No. 1,498,599 discloses an external nipple with a conical collar that rests on an insert in the rim. French Patent No. 1,516,857 discloses a rim insert for supporting an external spoke nipple. German Patentschrift No. 583 902 discloses a rim insert for supporting an external spoke nipple. European Published patent application no. EP 0 860 301 discloses an external nipple with a rounded collar and a rounded insert for supporting the nipple on the rim.

Bicycle wheel makers have long struggled with the problems that arise due to the fact that the spokes in a bicycle wheel do not extend radially from the hub to the rim. In other words, the spokes are skewed relative to a true radius. This is illustrated in FIGS. 1 and 2 hereof, which are based upon FIGS. 2 and 1, respectively, of U.S. Pat. No. 4,583,787 ("Michelotti"), the disclosure of which is incorporated herein by reference.

FIG. 1 illustrates what I call the centering angle of a spoke, in the context of a rim 10 that has a radius R. In the drawing, the radius R coincides with the center plane of a wheel including the rim 10, the center plane being perpendicular to the axis of rotation of the wheel and intersecting the center line of the rim. The longitudinal axis, designated SA, of a spoke (not shown) attached to a left hub flange (not shown) deviates from the rim radius R by an angle designated CA for centering angle. In the drawing, the spoke axis SA intersects the rim radius R outside of the rim 10. Because of this deviation, a spoke connected to the rim 10 and a left hub flange (not shown) exerts a lateral force which is balanced, more or less, depending on the spoking pattern, by an opposite lateral force exerted by one or more spokes (not shown) connecting the rim 10 to a right hub flange (not shown). These lateral forces keep the rim centered in the wheel center plane and provide essential lateral stability to radially spoked wheels and to tangentially spoked wheels. Thus, the name centering angle.

FIG. 2 illustrates what I call the torsional angle of a spoke, in the context of a rim 10 that has a radius R. In the drawing, the radius R coincides with the center plane of a wheel including the rim 10, the center plane being perpendicular to the axis of rotation of the wheel and intersecting the center line of the rim 12. The longitudinal axis, designated SA, of a spoke 14 attached to a right or left hub flange (not shown) deviates from the rim radius R by an angle designated TA for torsional angle. Because of this deviation, which is found in tangentially spoked wheels, primarily used as rear driving wheels, the spoke 14 is operable to transmit a pulling or torsional force from a rotating hub to the rim 12, tending to cause the rim to rotate. Thus, the name torsional angle. Generally speaking, there is no torsional angle in wheels that are radially spoked. Generally speaking, a spoke that has a torsional angle also has a centering angle.

Michelotti discloses eyelets or inserts which are intended to support the spoke nut or nipple in a skewed position, corresponding as required to the centering angle or the centering and torsional angle, as necessary. This approach does not and cannot account for dynamic displacements and distortions of a spoke under dynamic conditions. Further, the use of eyelets or inserts, as noted above, is labor intensive. In the case of Michelotti's eyelets, however, exact positioning and orientation of the eyelets is required to support each spoke, as intended.

SUMMARY OF THE INVENTION

The present invention is based upon the discovery of an improved wheel rim, an improved spoke nipple and an improved wheel including that rim and nipple. The rim has a lower section in which spokes are connected. A first, threaded end of each spoke extends through a spoke opening and into a cavity in the rim. A nipple with an internally threaded bore is connected to the threaded end of the spoke so that a first end of the nipple is seated on the floor of the rim and a second, opposed end is within the rim cavity. In other words, the nipple is located entirely within the rim cavity. According to the invention, that first end of the nipple has the shape of a portion of a sphere or ball and a portion of the rim floor is deformed or removed so as to define a portion of a socket so that the interior surface of the socket formed in the rim has the same curvature as the exterior ball-shaped surface of the first end of the nipple. This construction permits the end of the spoke and the nipple to align themselves, and to realign themselves, with the spoke, as needed, to prevent lateral forces from being imposed on the spoke, even under dynamic conditions when the spoke is tensioned and de-tensioned. Because the nipple is carried entirely within the rim cavity, only the spoke extends through a spoke opening in the rim, thereby minimizing the required diameter of the spoke opening in the rim and maximizing the area of the rim surface on which the rounded end of the internal nipple rests. The invention also extends to the case of an external nipple with a rounded collar, as disclosed in the Claes patent, in combination with a rim including a concave rounded rim surface formed in the rim itself, around a minimal diameter spoke opening so that there is more surface area on the rim, around the spoke opening, to support the external nipple than in prior art structures including a rim insert.

Accordingly, it is an object of the present invention to provide an improved rim with a socket formed integrally therein around each spoke opening to cooperate with a spherical portion of a first end of a nipple connected to the spoke.

It is a further object of the invention to provide an improved spoke nipple including a rounded portion at a lower end of the nipple, which cooperates with the socket shaped portion of the rim.

It is a further object of the present invention to provide a wheel incorporating the novel spoke, nipple and rim connection described herein.

It is yet another object of the present invention to provide a wheel in which the nipple and the end of a spoke connected therein orient themselves along the axis of the major portion of the spoke, to reduce stresses that would otherwise be imposed on the spoke.

These and other objects and advantages of rims, spoke nipples and wheels according to the present invention will be fully appreciated by those skilled in the art upon reviewing the disclosures herein.

BRIEF DESCRIPTION OF THE SEVERAL VIEWS OF THE DRAWING

FIG. 3 is a cross-sectional view through a portion of a rim according to a first embodiment of the present invention.

FIG. 4 is a cross-sectional view through a portion of a rim according to a second embodiment of the present invention.

FIG. 5 is a side view of a spoke nipple according to the present invention.

DETAILED DESCRIPTION OF THE PREFERRED EMBODIMENTS

Figure 1:
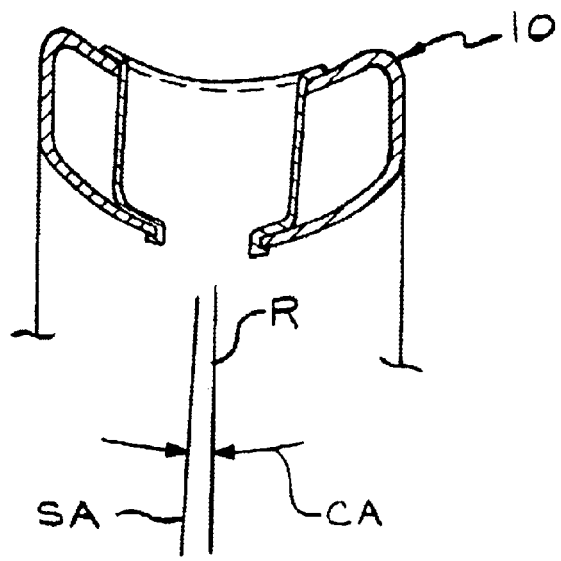
FIG. 1 is a modified version of FIG. 2 of the Michelotti patent, illustrating the centering angle of a spoke.
Figure 2:
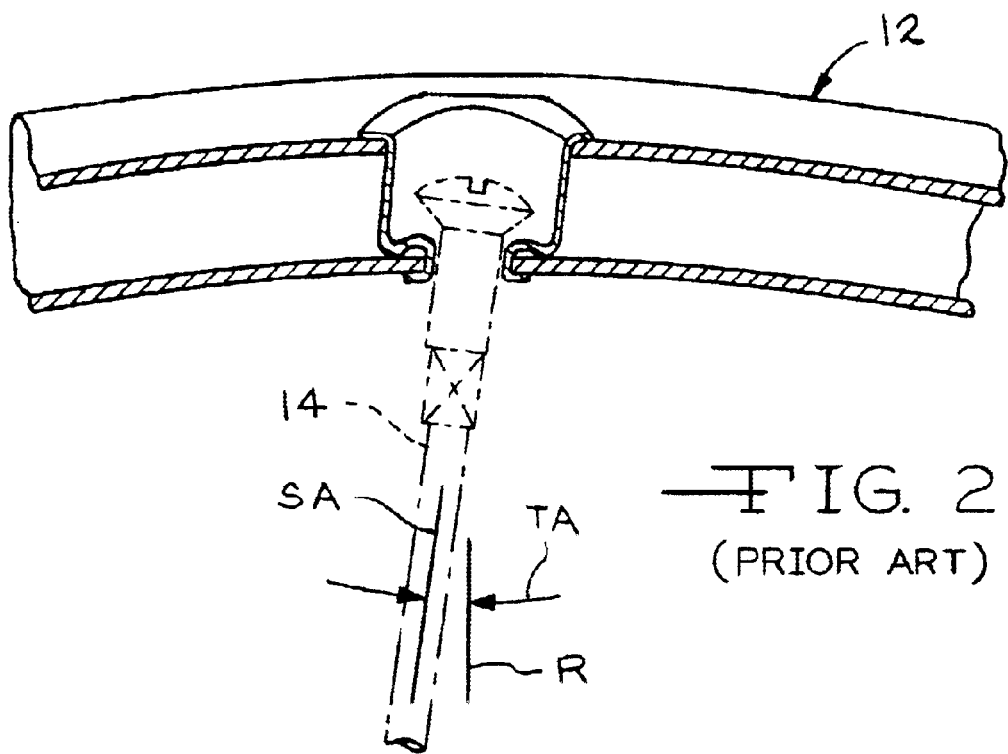
FIG. 2 is a modified version of FIG. 1 of the Michelotti patent, illustrating the torsional angle of a spoke.

Referring to FIG. 3, a rim according to the present invention is indicated generally at 100 and comprises a left side wall 102 and a right sidewall 104. A bottom portion of the rim 106 extends between the side walls 102 and 104. A wall 108 of a spoke bore defines a spoke opening through the bottom portion 106 of the rim 100. The bottom portion 106 of the rim 100 has been upset adjacent to the wall 108 of the spoke bore. Specifically, a tool T with a head H, including a spherical surface S, has been forced against the bottom portion 106 of the rim 100 to deform it to produce a concave, spherical surface 120 on the interior of the rim 100. The act of upsetting the bottom portion 106 of the rim 100 is facilitated by the use of an anvil A. A cavity C is formed in a working surface of the anvil A. The anvil A is positioned against the outside surface of the bottom portion 106 of the rim 100, with the cavity C aligned with and centered around the wall 108 of the spoke bore and the tool T is inserted into the rim 100 and aligned with the cavity C and the wall 108 of the spoke bore. The tool T is struck with enough force to upset the rim 100, adjacent to the wall 108 of the spoke bore, to produce the concave, spherical surface 120.

Referring now to FIG. 4, a rim 140 according to the present invention comprises side walls 142 and 144 and a bottom portion 146. A concave spherical surface 148 is formed on the interior surface of the bottom portion 146 of the rim 140. A cutting tool CT with a spherical cutter head CH is used to form the surface 148. A small amount of material is removed from the interior side of the bottom portion 146 of the rim 140, around a wall 150, which defines a spoke opening.

Referring now to FIG. 5, a spoke nipple according to the present invention is indicated generally at 170. The nipple 170 has a plurality of flats 172 so that torque can be applied to it by a suitable tool, such as a wrench (not shown). The nipple 170 is provided with an internally threaded longitudinally extending bore, indicated at 174, for engaging external threads provided on the end of a spoke (not shown in FIG. 5). A lower end 176 of the nipple 170 terminates in a convex, rounded surface 178. It is this rounded, convex surface that seats inside the rim 100 (FIG. 3) on the rounded, concave surface 120, or inside the rim 140 (FIG. 4) on the rounded, concave surface 148. It is preferred that the curvature of the surface 178 be the same as the curvature of the surface 120 or the surface 148.

Figure 6:
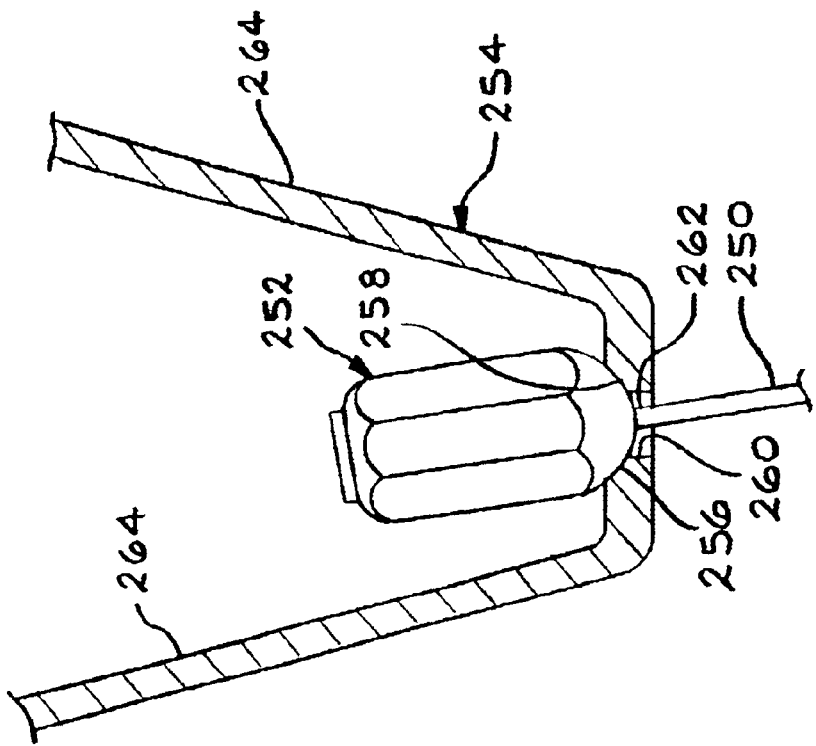
FIG. 6 is a view, partially in cross-section and similar to FIG. 3, of a rim showing a spoke and nut connection according to the present invention.

Referring now to FIG. 6, a spoke 200 and a nipple 202 are shown connected to a rim 204. The nipple 202 corresponds with the nipple 170 (FIG. 5) and the rim 204 corresponds with the rim 100 (FIG. 3). In this embodiment, the nipple 202 has a convex curved surface 206, which is seated on a concave curved surface 208 formed in the rim. Thus, the nipple 202 can pivot relative to the rim 204. As tension in the spoke 200 increases, as by rotation of the nipple 202, the nipple 202 will align itself with the longitudinal axis of the spoke 200, which is determined by the location of the connection of the other end (not shown) of the spoke 200 to a hub (not shown). Typically, this will involve a centering angle and, in the case of torque transmitting wheels, a torsional angle. Excellent results have been achieved in a case where the curved surface 206 and the curved surface 208 are spherical and have a curvature corresponding with a radius of 5 millimeters or a diameter of 10 millimeters.

A cylindrically shaped wall 210 defines a spoke hole in the rim 204. A rim portion 212 of the spoke 200 is adjacent to the wall 210. It will be appreciated that the rim portion 212 of the spoke 200 may be threaded, like the portion (not shown) of the spoke 200 that is inside of the nut 202, or it may be unthreaded. In the case where the nipple 202 is relatively short, the internal threads 174 (FIG. 5) will extend pretty much the length of the nipple, and the rim portion 212

(FIG. 6) of the spoke 200 will likely be threaded, as well, with the spoke threads (not shown) terminating below the rim 204 in FIG. 6. In the case of a relatively long nipple 202, it is possible to counterbore the nipple 202, adjacent to the rounded surface 206 so that all of the spoke threads are within the nipple 202 and the spoke portion 212 is unthreaded. According to the preferred embodiment of the invention, excellent results have been achieved where the diameter of the cylindrically shaped wall 210, i.e., the diameter of the spoke hole, is approximately 0.141 inch in a case where the major diameter of the threaded rim portion 212 of the spoke 200 is about 0.090 inch. This provides enough clearance between the spoke 200 and the wall 210 to permit the spoke 200 to be skewed, according to the centering angle or the combination of the centering angle and the torsional angle, as the spoke 200 passes through the spoke bore in the rim 204. In any case, according to the present invention, the diameter of the spoke hole through the rim must be greater than the diameter of the portion of the spoke, which extends through the spoke hole. However, the diameter of the spoke hole should be kept as small as possible, to maximize the area of contact between the curved surfaces 206 and 208, while still providing the clearance required for the spoke to pivot. Preferably, the diameter of the spoke opening is about 1.5 times the diameter, or the major diameter, of the rim portion of the spoke extending therethrough. In the example given above, the ratio is a little less than 1.6 to 1.0. Preferably, the diameter of the spoke opening in the rim is 2.0 times or less than the diameter of the rim portion of the spoke. More preferably, the diameter of the spoke opening in the rim is 1.8 times or less than the diameter of the rim portion of the spoke. Even more preferred is the case where the diameter of the spoke opening in the rim is 1.6 times or less than the diameter of the rim portion of the spoke.

It is noted that the spoke bore defined by the wall 210 extends radially, and that it is centered between the side walls of the rim 204. This is preferred because it is very easy to machine. Other spoke bore orientations are within the scope of the present invention, however. In a case where the axes of the spoke bores are oriented so that they are aligned with the axes of the spokes, taking into account the centering angle and the torsional angle, if present, the diameter of the spoke opening in the rim can be 1.4 times or less than diameter of the rim portion of the spoke extending therethrough, or, even more preferably, 1.2 times or less than the diameter of the rim portion of the spoke. However, the present invention eliminates the need, apparently felt by some wheel builders, to drill spoke holes off of the center plane of the wheel/rim, in a vain effort to align the axis of the spoke hole with the centering angle or the centering angle and the torsional angle of the spoke. The effort is in vain, especially in the case of rear or torque transmitting wheels, because dynamic forces will cause movement of the spokes that can't be accounted for in static spoke connections. However, with a rim and spoke nipple according to the invention, such movement can be accommodated in the case where the spoke openings in the rim are aligned, more or less, with the axes of the spokes extending through them.

Figure 7:
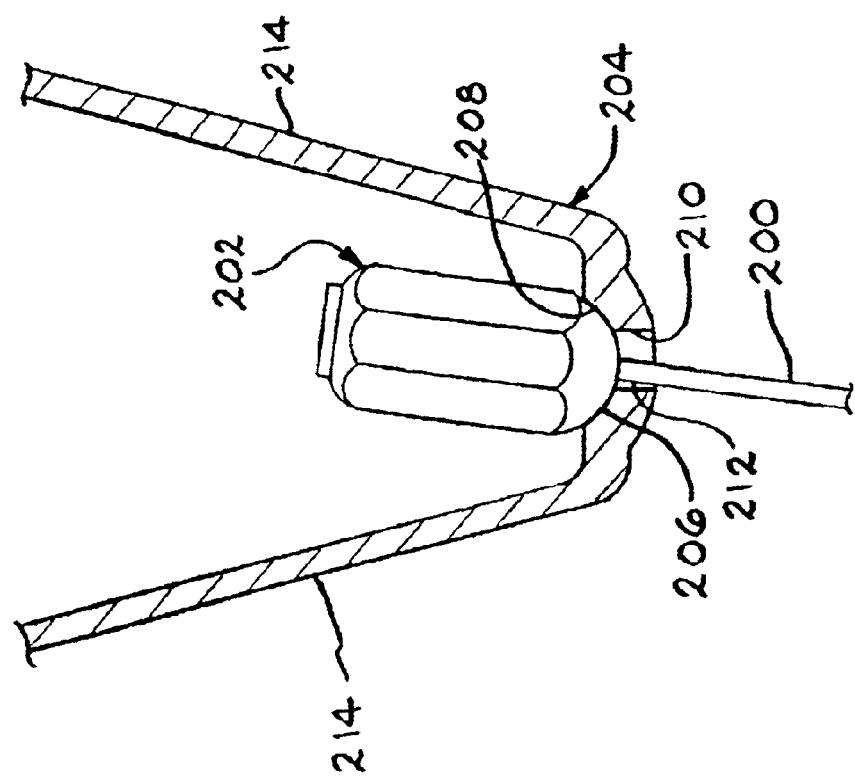
FIG. 7 is a view, partially in cross-section and similar to FIG. 4, of a rim showing a spoke and nut connection according to the present invention.

Referring now to FIG. 7, a spoke 250 and a nipple 252 are shown connected to a rim 254. The nipple 252 corresponds with the nipple 170 (FIG. 5) and the rim 254 corresponds with the rim 140 (FIG. 4). In this embodiment, the nipple 252 has a convex curved surface 256, which is seated on a concave curved surface 258 formed in the rim, according to the method described above with reference to FIG. 4. Thus, the nipple 252 can pivot relative to the rim 254. As tension in the spoke 250 increases, as by rotation of the nipple 252, the nipple 252 will align itself with the longitudinal axis of the spoke. Excellent results have been achieved in a case where the curved surface 256 and the curved surface 258 are spherical and have a curvature corresponding with a radius of 5 millimeters or a diameter of 10 millimeters.

A cylindrically shaped wall 260 defines a spoke hole in the rim 254. A rim portion 262 of the spoke 250 is adjacent to the wall 260. According to a preferred embodiment of the invention, the diameter of the cylindrically shaped wall, i.e., the diameter of the spoke hole is approximately 0.141 inch in the case where the major diameter of the threaded rim portion 262 of the spoke 250 is about 0.090 inch. This provides the clearance between the spoke rim portion 262 and the wall 260 that is needed to permit the spoke 250 to be skewed, according to the centering angle or the combination of the centering angle and the torsional angle, as the spoke 250 passes through the spoke bore in the rim 254. In any case according to the present invention, the diameter of the spoke hole through the rim must be greater than the diameter of the portion of the spoke, which extends through the spoke hole. However, the diameter of the spoke hole should be kept as small as possible, to maximize the area of contact between the curved surfaces 256 and 258, while still providing the clearance required for the nipple and spoke to pivot. It is noted that the spoke bore defined by the wall 260 extends radially, and that it is centered between the side walls of the rim 264. This is preferred, for the reasons set forth above.

In the case of a wheel according to the present invention including external nipples as described in the Claes patent, the rounded portion of the collar will be seated directly on a curved surface formed in the rim itself. Because the nipple isn't elevated off of the bottom portion of the rim, as in the case where an insert or eyelet is used as explicitly taught in the Claes patent, the degree of clearance required in the spoke opening in the rim is minimized compared to the prior art. This maximizes the surface area of the rim bottom that actually supports the nipple, thereby producing a stronger spoke connection to the rim. The relationships described above, between the diameters of the spoke holes in the rim and the diameters of the rim portions of the spokes, applies equally to the diameters of the spoke openings and the outer diameter of the portion of an external nipple extending through the rim. The relationships described above between the diameters of spoke holes oriented to align with the axes of spokes extending through them and the diameters of the spokes extending through them, applies equally to the relationships between the diameters of the spoke openings and the outer diameters of the portion of an external nipple extending through the rim.

It will be appreciated that the nipple and rim construction set forth above not only accommodates the centering angle, as illustrated in FIGS. 6 and 7, but also accommodates the torsional angle, as well.

What is claimed is:

1. A wheel comprising
    a rim having a bottom portion with spoke openings extending therethrough, and a recess with a rounded concave surface in the top of said bottom portion surrounding each of the spoke openings
    a hub,
    a plurality of spokes extending through the spoke openings in said bottom portion of said rim and connecting said rim to said hub,
    a plurality of spoke nipples positioned wholly inside of said rim, connected to ends of said spokes, said nipples having lower portions including convex rounded surfaces which are seated in the recesses surrounding the spoke openings, wherein the convex rounded surfaces of said nipples cooperate with the concave rounded surfaces of the recesses so that said nipples can pivot relative to said rim.

2. The wheel claimed in claim 1 wherein the diameters of the spoke openings are not greater than 2.0 times the diameters of portions of said spokes that extend through said spoke openings.

3. The wheel claimed in claim 1 wherein the diameters of the spoke openings are not greater than 1.8 times the diameters of portions of said spokes that extend through said spoke openings.

4. The wheel claimed in claim 1 wherein the diameters of the spoke openings are not greater than 1.6 times the diameters of portions of said spokes that extend through said spoke openings.

5. The wheel claimed in claim 1 wherein the diameters of the spoke openings are not greater than 1.4 times the diameters of portions of said spokes that extend through said spoke openings.

6. The wheel claimed in claim 1 wherein the diameters of the spoke openings are not greater than 1.2 times the diameters of portions of said spokes that extend through said spoke openings.

7. A wheel comprising
   a rim having a bottom portion with spoke openings extending therethrough, and a recess with a rounded concave surface in the top of said bottom portion surrounding each of the spoke openings
   a hub,
   a plurality of spokes extending through the spoke openings in said bottom portion of said rim and connecting said rim to said hub,
   a plurality of spoke nipples positioned inside of said rim, connected to ends of said spokes, said nipples having lower portions including convex rounded surfaces which are seated in the recesses surrounding the spoke openings,
   wherein the convex rounded surfaces of said nipples cooperate with the concave rounded surfaces of the recesses so that said nipples can pivot relative to said rim and
   wherein said spoke nipples do not extend outside of said rim.

8. The wheel claimed in claim 7 wherein the diameters of the spoke openings are not greater than 2.0 times the diameters of portions of said spokes that extend through said spoke openings.

9. The wheel claimed in claim 7 wherein the diameters of the spoke openings are not greater than 1.8 times the diameters of portions of said spokes that extend through said spoke openings.

10. The wheel claimed in claim 7 wherein the diameters of the spoke openings are not greater than 1.6 times the diameters of portions of said spokes that extend through said spoke openings.

11. The wheel claimed in claim 7 wherein the diameters of the spoke openings are not greater than 1.4 times the diameters of portions of said spokes that extend through said spoke openings.

12. The wheel claimed in claim 7 wherein the diameters of the spoke openings are not greater than 1.2 times the diameters of portions of said spokes that extend through said spoke openings.

* * * * *